United States Patent [19]

Miyagi et al.

[11] Patent Number: 4,663,041
[45] Date of Patent: May 5, 1987

[54] FLUOROCARBON FILTER ELEMENT

[75] Inventors: Tokuya Miyagi, Osaka; Akihisa Inoue, Hirakata; Katushi Hamada; Shoichi Fujimori, both of Neyagawa; Yoshihiro Hori, Shimizu, all of Japan

[73] Assignee: Kurashiki Baseki Kabushiki Kaisha, Japan

[21] Appl. No.: 803,475

[22] Filed: Dec. 2, 1985

Related U.S. Application Data

[62] Division of Ser. No. 608,309, May 8, 1984, Pat. No. 4,588,464.

[30] Foreign Application Priority Data

Sep. 9, 1983 [JP] Japan .................. 58-167202

[51] Int. Cl.$^4$ ............................................. B01D 27/06
[52] U.S. Cl. .................. 210/493.2; 210/493.5; 55/500; 55/502; 55/521
[58] Field of Search ............... 210/433.1, 493.1, 493.2, 210/497.01; 55/498, 500, 521, 529, 501, 502

[56] References Cited

U.S. PATENT DOCUMENTS

| | | | |
|---|---|---|---|
| 3,457,339 | 7/1969 | Pall et al. | 264/162 |
| 3,720,323 | 3/1973 | Landree | 210/493.2 |
| 3,867,294 | 2/1975 | Pall et al. | 210/493.2 |
| 4,033,881 | 7/1977 | Pall | 210/493.2 |
| 4,154,688 | 5/1979 | Pall | 210/487 |
| 4,290,889 | 9/1981 | Erickson | 210/493.2 |
| 4,402,830 | 9/1983 | Pall | 210/493.2 |

FOREIGN PATENT DOCUMENTS 701335 1/1965 Canada .................. 210/493.2

Primary Examiner—Richard V. Fisher
Assistant Examiner—Wanda L. Millard
Attorney, Agent, or Firm—Ostrolenk, Faber, Gerb & Soffen

[57] ABSTRACT

The present invention provides a filter element made wholly of fluorocarbon resin, including as essential elements a filter material produced by folding a sandwich-form sheet comprising a filter membrane made of a fluorocarbon resin and net supporters made of a thermoplastic fluorocarbon resin superimposed on the both surfaces thereof into a pleat form and liquid-tightly welding the edge parts of the both sides of the pleated sheet, sealed end parts produced by embedding the both end parts of said filter material except the central openings into a thermoplastic fluorocarbon resin to force the resin into the pleats, whereby the both end parts are each integrally and tightly welded, and fluorocarbon resin caps welded liquid-tightly with said sealed end parts, and production thereof. The filter element of the present invention is characterized in that materials for the element are wholly a fluorocarbon resin, so that problems of chemicals resistance, temperature resistance and metal leaching are not caused, and besides that fluorocarbon resins which have so far been regarded as difficult to weld together, are in a liquid-tightly welded state by the special constitution.

5 Claims, 8 Drawing Figures

FLUOROCARBON FILTER ELEMENT

This is a division application Ser. No. 608,309 filed May 8, 1984 now U.S. Pat. No. 4,588,464.

BACKGROUND OF THE INVENTION

In recent years, super-clarification techniques for air, gases, water, chemicals, etc. based on the membrane separation techniques have made a remarkable progress and are widely used in various fields such as the fields of foods, semi-conductors and the like. Particularly, a chemicals clarification technique required for fine processing in the process for producing semi-conductor integrated circuits is behind in technical response as compared with the clarification technique for air, gases, water, etc., and it is recently attracting a special attention. As one of the main reasons for that, while increasing the purity of chemicals is being required in attaining an improvement in the yield and quality of products, both semi-conductor integrated circuit manufacturers and chemicals suppliers are behind in their technical response, there is given delay in the development of filter products which are less in metal leaching and good in chemicals resistance. As filters which meet the above requirements at present, ones made wholly of fluorocarbon resins are being required, and membrane filters of a multi-flat membrane system and a tubular form have been developed. But, these filters have not yet come to satisfy the needs of the market, because both effective filter area and flow rate of filtration are so small that there are caused problems in filtration of highly viscous chemicals and mass treatment.

On the other hand, a pleat-form filter element with fluorocarbon resin membranes has been developed. This filter element has a large effective filter area as well as a fairly superior chemicals resistance, but because of the adhesion of fluorocarbon resin being very difficult in itself, parts other than the filter membrane are made of materials other than fluorocarbon resin which are not sufficient in terms of chemicals resistance, temperature resistance and metal leaching.

Consequently, satisfactory products are not yet obtained.

Further, a filter employed in the foregoing process for producing semi-conductor integrated circuits requires pores as very fine as 0.01 to 10 $\mu$m. Also, the filter membrane itself is very low in strength, so that severe conditions cannot be employed on filter production, and besides the members of the filter element must be assembled not by mere adhesion, but by strong adhesion in a completely sealed state.

U.S. Pat. No. 3,457,339 discloses a production of a tubular shape filter having a leakproof property by applying a thermoplastic end caps which inside face is fused to a filter sheet material formed in a tubular shape. However, in case that the end cap is a fluorocarbon resin, even if the inside face of the cap is fused at temperature above the melting point, the fused resin can not penetrate pleats of filter because of its high viscosity.

Consequently, U.S. Pat. No. 3,457,339 can not be applied to a filter element made wholly of fluorocarbon.

SUMMARY OF THE INVENTION

The present invention relates to a filter element made wholly of a fluorocarbon resin and a production thereof.

According to the present invention the problems of chemicals resistance, temperature resistance and metal leaching etc. are not caused, and the fluorocarbon resins which have so far been regarded as difficult to weld together, are in a liquid-tightly welded state by the special constitution.

DETAILED DESCRIPTION OF THE INVENTION

The present invention relates to a filter element made wholly of a fluorocarbon resin and its production.

Figure 1:
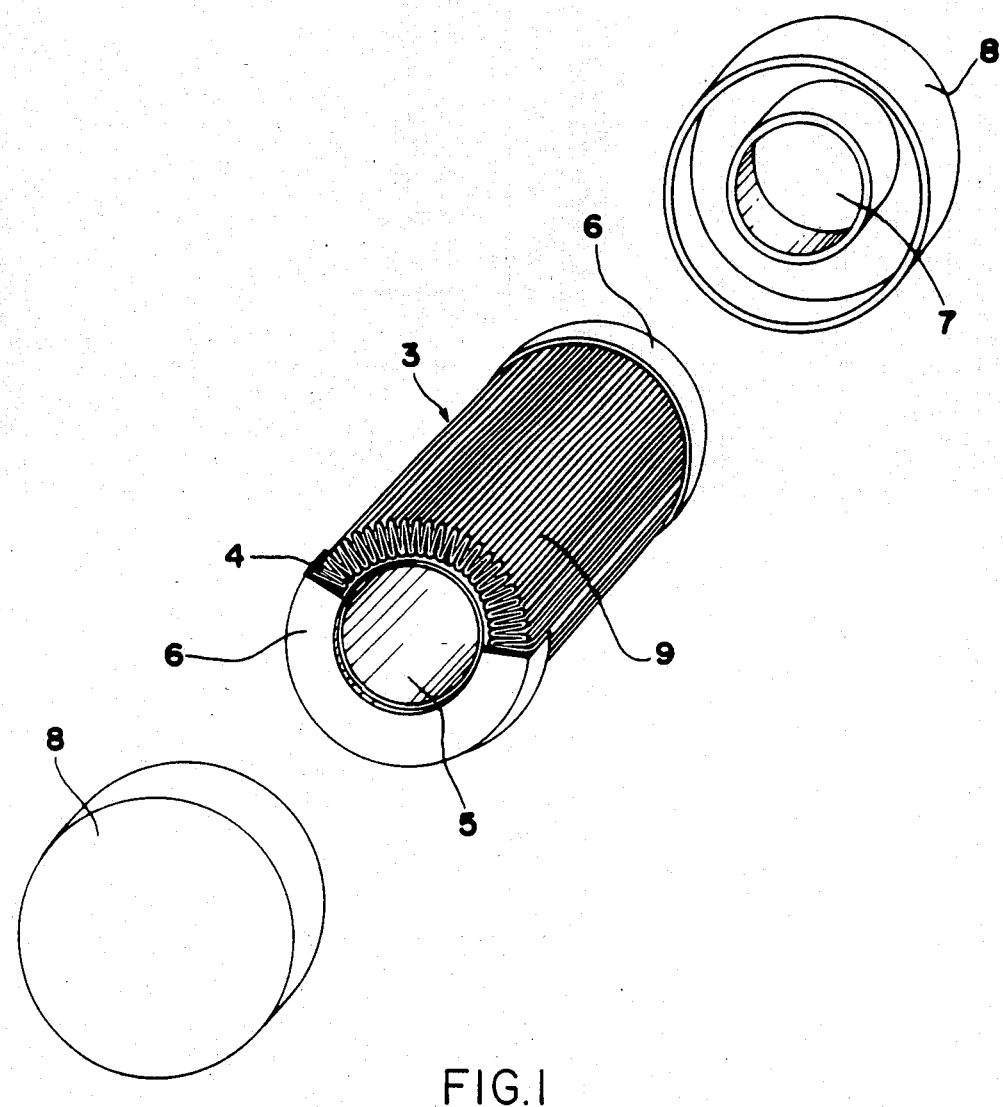
FIG. 1 is a typical view illustrating the filter element of the present invention (in the view, the filter material and the cap are shown separately).
Figure 2:
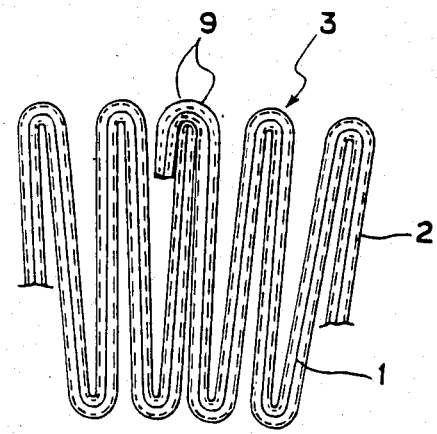
FIGS. 2 to 4 are typical views illustrating a form to weld the edge parts of the both sides of the pleat.

The present invention, as shown in FIGS. 1 and 2, provides a filter element made wholly of a fluorocarbon resin comprising as essential elements a filter material (3) produced by folding a sandwich-form sheet comprising a filter membrane (1) made of a fluorocarbon resin and net supporters (2) made of a thermoplastic fluorocarbon resin superimposed on the both surfaces thereof into a pleat form and liquid-tightly welding the edge parts of the both sides of the pleated sheet into a cylinder, sealed end parts (6) produced by embedding the both end parts (4) of said filter material except the central opening (5) into a thermoplactic fluorocarbon resin to force the resin into the pleats, whereby the both end parts are each integrally and tightly welded, and fluorocarbon resin caps (8) having a prescribed shape welded liquid-tightly with said sealed end parts (in FIG. 1, the sealed end part and the cap are separately shown for facilitating understanding), and production thereof.

The filter element of the present invention is characterized in that materials for the element are wholly a fluorocarbon resin, so that problems of chemicals resistance, temperature resistance and leaching etc. are not caused, and besides that fluorocarbon resins which have so far been regarded as difficult to weld together, are in a liquid-tightly welded state by the special constitution. A filter element made wholly of a fluorocarbon resin like this is completely novel.

The filter membrane (1) used in the present invention is made of a fluorocarbon resin selected from tetrafluoroethylene resin (hereinafter referred to as PTFE), tetrafluoroethylene copolymer, fluorovinylidene resin (hereinafter referred to as PVdF) and the like. Most preferable one is PTFE in terms of chemical resistance, temperature resistance and metal leaching. It may be laminated with a porous reinforcing material made of a fluorocarbon resin. This membrane itself is well known as a filter membrane. Relating to the thickness of the membrane and the diameter of the pore, it suffices to optionally select them according to the kind of liquors to be treated and the object of filtration. Generally, however, membranes of 30 to 200 μm in thickness and 0.01 to 10 μm in pore diameter are used. This membrane is low in mechanical strength and easily deformed by filter pressure so that, in order to keep the pleat form, the membrane is used in the form of a sandwich in which fluorocarbon resin net supporters are superimposed on the both surfaces of the membrane. As the filter membrane, for example a membrane produced by welding a fluoroethylene polymer onto the surface of glass fibers, as described in Japanese Patent Application Kokai (Laid-open) No. 14919/1983, has an increased strength, but no fine pores. Besides, it is not sufficient in terms of chemicals resistance, metal leaching etc., not meeting the object of the present invention. Such membrane, therefore, cannot be used.

The filter membrane of a fluorocarbon resin, especially PTFE, is placed between thermoplastic fluorocarbon resin net supporters (2) in a sandwich form. These supporters are a spacer for the filter membrane to act effectively over the whole area on filtration, and at the same time, they prevent the membrane from deformation by filter pressure. Besides, they play an important role to ensure the welding of the edge parts of the both sides of the membrane. PTFE, a material for the filter membrane, is very difficult to be thermally welded and very low in membrane strength, so that it is difficult to liquid-tightly weld the both end parts (4). This may be considered to be one of the reasons for that cylindrical filter elements made wholly of a fluorocarbon resin have not so far been provided.

As a material for the net supporter (2), there are used thermoplastic fluorocarbon resins such as tetrafluoroethylene/perfluoroalkyl vinyl ether copolymer resin (hereinafter referred to as PFA), tetrafluoroethylene/hexafluoropropylene copolymer resin (hereinafter referred to as FEP), ethylene/tetrafluoroethylene copolymer resin (hereinafter referred to as ETFE), trifluorochloroethylene resin (hereinafter referred to as PCTFE), ethylene/trifluorochloroethylene copolymer resin (hereinafter referred to as ECTFE), fluorovinylidene resin (hereinafter referred to as PVdF), fluorovinyl resin (hereinafter referred to as PVF), tetrafluoroethylene/hexafluoropropylene/perfluoroalkyl vinyl ether terpolymer resin (hereinafter referred to as EPE) and the like. Particularly preferred ones are PFA, FEP and EPE in terms of chemicals resistance and temperature resistance.

The net supporter is porous materials such as plain woven fabrics, welded non-woven fabrics, formed nets, knitting goods, punching sheets and the like of fluorocarbon resin fibers. Preferably, the supporter has flexibility of such a degree that it is not deformed easily by filter pressure. For this reason, supporters of 0.1 to 1.0 mm in thickness and of about 0.1 to about 5 mm$^2$ in pore area are generally used.

The filter membrane is placed between the net supporters in a sandwich form, folded in pleats and welded liquid-tightly at the edge parts of the both sides into a pleat-form cylinder. The filter membrane and the net supporter may form a multi-layer structure (for example, supporter—membrane—supporter—membrane'-supporter).

Figure 3:
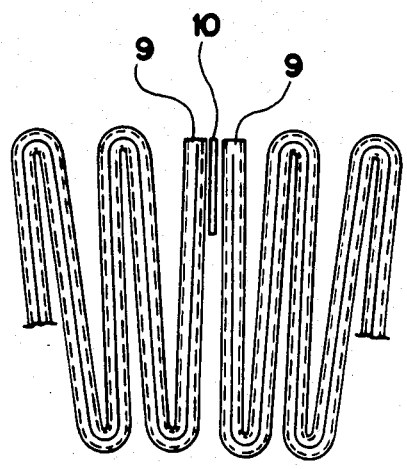
Figure 4:
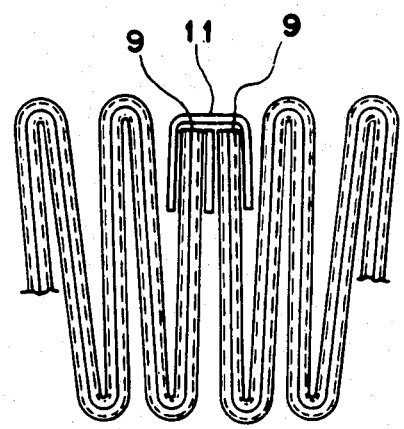
Figure 5:
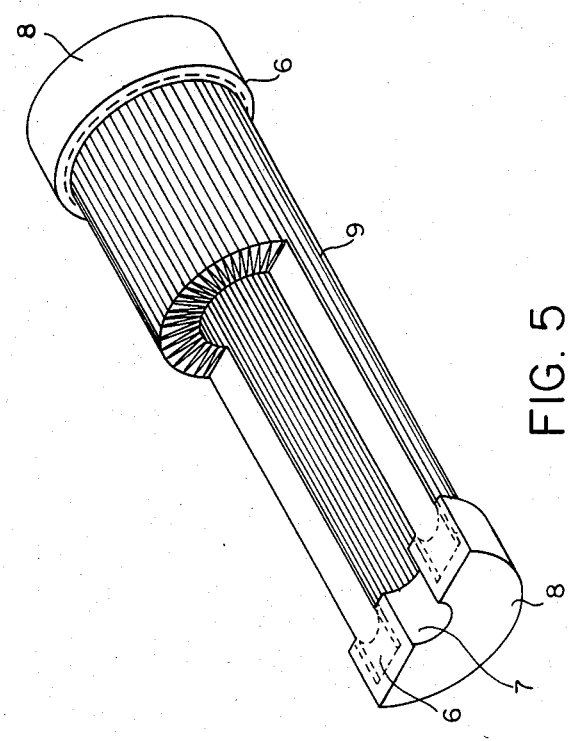
FIG. 5 is a partially selectional view of the integrally welded filter element.

The edge parts (9) of the both sides may be welded together, for example, by lengthening the edge part of one side of the sheet, externally covering the edge part of the other side with the lengthened edge part and integrally welding the both edge parts, as shown in FIG. 2; by placing a sealing tape (10) made of a thermoplastic fluorocarbon resin between said edge parts, followed by integrally welding, as shown in FIG. 3; or by covering the edge parts with a sealing cover (11) made of thermoplastic fluorocarbon resin, followed by integrally welding, as shown in FIG. 4. As these sealing tape and sealing cover, PFA, FEP, EPE, etc. superior in chemicals resistance and weldability are preferred. In the embodiments shown in FIGS. 3 and 4, the pressure resistance of the seal improves.

The filter material thus obtained is thoroughly heated at its both end parts (4) to a temperature higher than the melting point of the resin constituting the net supporter to pre-weld the pleats. This treatment is important as a pre-treatment for the subsequent formation of sealed end parts by forcing a fluorocarbon resin into the pleats at the both end parts of the pleat-form filter to effect tight welding. As described later, the welding of the both end parts of the pleat-form filter is carried out by pressing said both parts into a mold containing a molten fluorocarbon resin. In this case, if the foregoing pre-welding of the pleats has been omitted, the pleats, because of the high viscosity of the molten fluorocarbon resin, buckle to make it impossible for the resin to enter the pleats. In other words, such a state does not occur that the filter membrane has been embedded in the fluorocarbon resin. Consequently, only incomplete seal is obtained, and the pressure resistance is also insufficient.

In the above pre-welding of the pleats, complete and integral welding of the whole pleats is not necessary, but it suffices to carry out the pre-welding to such a degree that the above problem occurring on the formation of sealed end parts can be avoided.

The filter material thus obtained is welded as its both end parts (4) by embedding said parts except an opening (5) for the passage of liquor in a thermoplastic fluorocarbon resin. The welding is carried out by filing a circular mold which can receive the end part of the filter material with a sealing thermoplastic fluorocarbon resin, melting the resin by heating, and pressing the end part into the molten resin to force the resin into the pleats. In this case, the heating is continued until said fluorocarbon resin enters the pleats, and the end part of the filter material made of a fluorocarbon resin is melted at at least the surface and welded with said entering fluorocarbon resin to form an integrated mass. As the thermoplastic fluorocarbon resin for sealing, any of PFA, FEP, ETFE, PCTFE, ECTFE, PVdF, PVF, EPE, etc. except PTFE may be used, but PFA, FEP and EPE are particularly preferred in terms of chemicals resistance. PTFE is interior in weldability as well as high in viscosity on melting, so that pressing the end part of the filter materials into PTFE is difficult, and air bubbles remain in the pleats to cause leak. PTFE is not therefore desirable.

Figure 6:
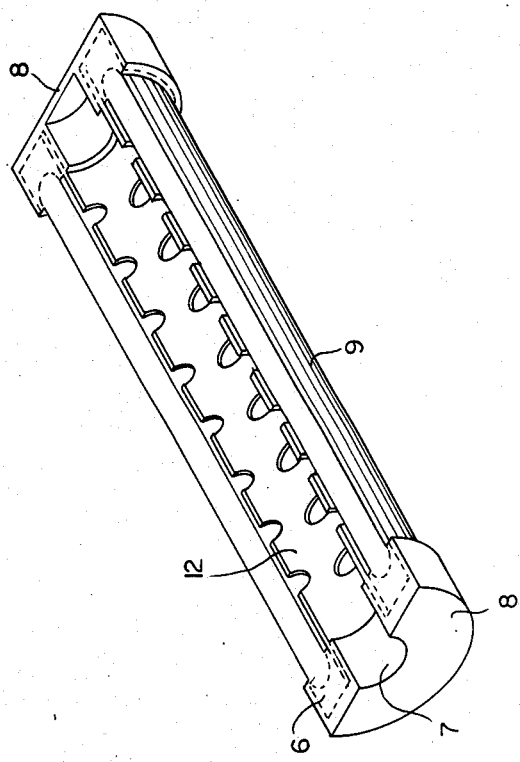
FIG. 6 is a sectional view of the integrally welded filter element wherein a fluorocarbon resin core material supports the filter material.
Figure 8:
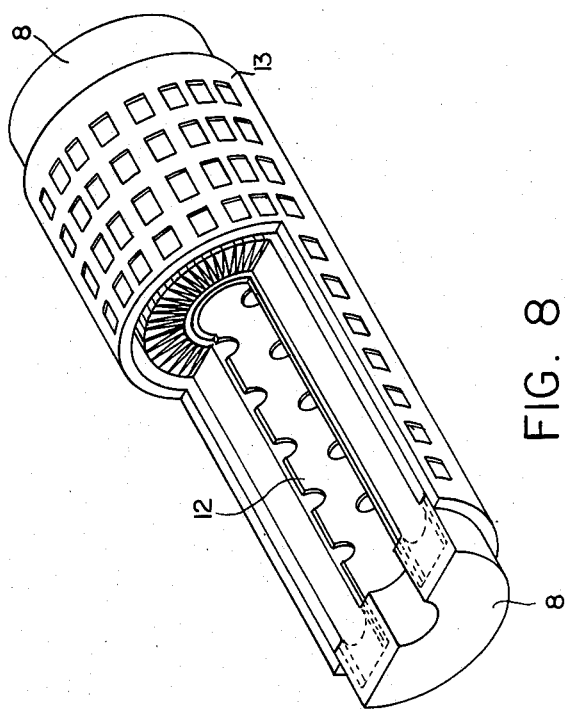
FIG. 8 is similar to FIG. 7 except that both a flurocarbon resin core and protective jacket are shown.

The sealed end part (6) is further welded with a cap (8) having a prescribed shape and when desired, a porous hollow cylindrical core material (a passage for removing the filtrate) fit for the central opening (5) of the both end parts of the filter material the cylindrical core 12 is shown in FIGS. 6 and 8.

For welding, various methods such as heat-welding, rotational welding, insert-injection, cylinder injection, etc. may be employed. In the case of heat-welding, the cap and core material having previously molded prescribed shapes, both of which are made of a fluorocarbon resin, are fitted to the sealed end part, and the assembly is inserted in a mold and heated to a temperature higher than the melting point of the fluorocarbon resin constituting the sealed end part, thereby liquid-tightly and completely welding the entire side surface and/or the entire bottom surface of the cap. Both the caps to be welded with the both end parts may have a central opening (7), or one of them may have a central opening and the other may be a cap having no central opening.

When the sealed end part has not previously been formed, welding between the cap and the filter material is incomplete and fails to obtain a completely sealed filter element.

A fluorocarbon resin used for the cap may be any of the foregoing fluorocarbon resins, but PTFE, FEP, PFA and EPE are preferred in terms of chemicals resistance. More preferably, the same resins as used for sealing the end part are used in terms of adhesiveness.

Also in the case of the core material, any of the foregoing fluorocarbon resins may be used, but in terms of chemicals resistance and adhesiveness, PTFE, FEP, PFA and EPE are preferred. Particularly, the same resins as used for sealing the end part are preferred.

Figure 7:
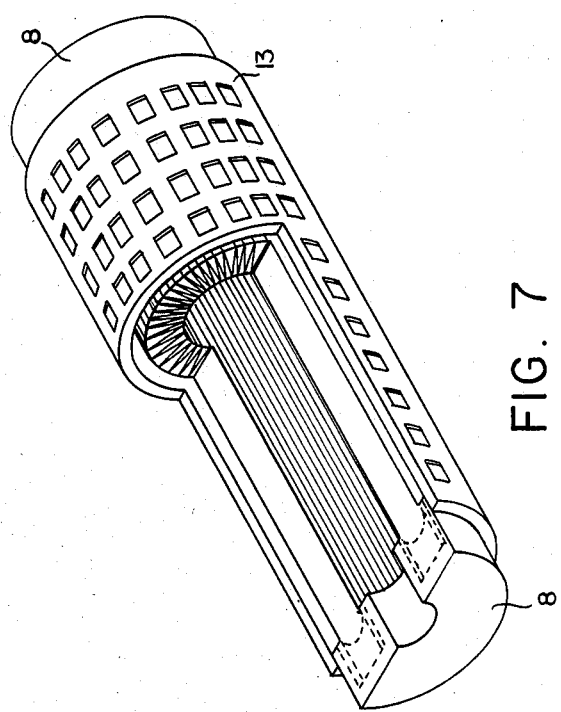
FIG. 7 is a partially sectional view of the filter element wherein a fluorocarbon resin protective jacket covers the filter element.

With the filter element of the present invention, the outside of the filter material may be covered with a cylindrical protective jacket 13 made of a fluorocarbon resin, if desired. This protective jacket 13 is shown in FIGS. 7 and 8 and may be made of a panel having a number of pores for a liquor to be treated to pass therethrough, and it need not always be integrally welded with the filter element. The jacket may be fitted to the inside of the cap, or to the outside of the cap.

The filter element of the present invention is made wholly of a fluorocarbon resin, so that it is superior in chemical resistance, temperature resistance and cause no problems of metal leaching, etc. Besides, it is possible to filter a liquid to be treated containing contaminants as very fine as 0.1 $\mu$m and so, and therefore, the filter element is particularly useful in clarifying chemicals, etc. used in a process for producing semi-conductor integrated circuits.

Next, the present invention will be illustrated with reference to the following example.

EXAMPLE

A sandwich-form sheet comprising a PTFE filter membrane (thickness, 60 $\mu$m; average pore diameter, 0.22 $\mu$m; area, 260×2200 mm$^2$) and EPE net supporters (average thickness, 0.3 mm; rate of pore area, 50%; area 260×2200 mm$^2$) superimposed above and below said filter membrane, is formed into a 78-pleated sheet.

The edge parts of the both sides of the pleated sheet are placed one upon the other, and an EPE film (width, 5 mm; length, 260 mm; thickness, 50 $\mu$m) is inserted between them (FIG. 3). The edge parts are then heat-welded by means of a commercially available impulse sealer to obtain a cylindrical pleat-form filter material (internal diameter, 36 mm; largest external diameter, 65 mm; length, 260 mm). This heat-welded part has a completely liquid-tight seal.

The both end parts of this cylindrical pleat-form filter material are inserted by 15 mm each into a heating furnace, heat-treated at 350° C. for 30 minutes, taken out thereof and cooled.

Separately from this, into a circular mold fit for the above heat-treated end part is inserted an EPE sheet (thickness, 5 mm) of the same shape as that of the bottom of the mold, and the mold is heated to 320° C. to melt the EPE sheet. Said heat-treated end part is then inserted into the mold to force the molten resin into the pleates and kept at 320° C. for 15 minutes. Thereafter, the mold is cooled and the end part is taken out thereof. The sealed end part of the filter material obtained is in a state wherein the PTFE membrane is completely embedded in the EPE resin, besides the PTFE membrane and the EPE resin are integrally welded together, being resistant to high pressure.

An EPE porous cylindrical core material (external diameter, 35 mm; internal diameter, 30 mm; length, 253 mm; number of pores, 36 mm$^2$×176) is inserted from end to end into the central opening of the end part-sealed filter material. An EPE end cap, which is a set with the core material, is then fitted in one end part. This assembly is placed in a mold, heated to 320° C. for 40 minutes and after cooled, taken out thereof. The other end part is also treated in the same manner.

The filter element thus obtained was liquid-tightly and strongly welded at the side edge part of the pleat and the end parts as well as at the cap parts, there being no leak, and besides it was resistant to high pressure.

What is claimed is:

1. A filter element consisting of fluorocarbon resin elements and comprising as essential elements a filter material produced by folding a sandwich-form sheet comprising a filter membrane made of tetrafluoroethylene resin (PTFE) and net supporters made of tetrafluoroethylene/perfluoroalkyl vinyl ether copolymer resin (PFA), tetrafluoroethylene/hexafluoropropylene copolymer resin (FEP) or tetrafluoroethylene/hexafluoropropylene/perfluoroalkyl vinyl ether terpolymer resin (EPE) superimposed on the both surfaces thereof into a pleat form and liquid-tightly welding the edges parts of the both sides of the pleated sheet, sealed end parts produced by embedding the both end part of said filter material except the central openings into a thermoplastic fluorocarbon resin selected from the group consisting of PFA, FEP and EPE to force the resin into the pleats, whereby the both end parts are each integrally and tightly welded, and fluorocarbon resin caps welded liquid-tightly with said sealed end parts.

2. A filter element as described in claim 1, wherein the diameter of the fine pores of the filter membrane is 0.01 to 10 $\mu$m.

3. A filter element as described in claim 1, wherein the caps are made of PTFE, FEP, PFA or EPE.

4. A filter element as described in claim 1, wherein the element is provided with an additional fluorocarbon resin core material of PTFE, FEP, PFA or EPE for supporting the filter material.

5. A filter element as described in claim 1, wherein the element is provided with an additional fluorocarbon resin protective jacket.

* * * * *